(12) United States Patent
Garg et al.

(10) Patent No.: US 8,723,969 B2
(45) Date of Patent: May 13, 2014

(54) COMPENSATING FOR UNDESIRABLE CAMERA SHAKES DURING VIDEO CAPTURE

(75) Inventors: Shashank Garg, Pune (IN); Vinayak Pore, Pune (IN); Ashish Thakur, Pune (IN); Shang-Hung Lin, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 904 days.

(21) Appl. No.: 11/688,263

(22) Filed: Mar. 20, 2007

(65) Prior Publication Data
US 2008/0231718 A1    Sep. 25, 2008

(51) Int. Cl.
*H04N 5/228* (2006.01)

(52) U.S. Cl.
USPC ............ 348/208.99; 348/208.1; 348/208.13

(58) Field of Classification Search
USPC ............. 348/222.1, 208.99, 333.02, 208.1, 348/208.14
See application file for complete search history.

(56) References Cited

U.S. PATENT DOCUMENTS

| | | | |
|---|---|---|---|
| 3,904,818 A | 9/1975 | Kovac | |
| 4,253,120 A | 2/1981 | Levine | |
| 4,646,251 A | 2/1987 | Hayes et al. | |
| 4,685,071 A | 8/1987 | Lee | |
| 4,739,495 A | 4/1988 | Levine | |
| 4,771,470 A | 9/1988 | Geiser et al. | |
| 4,920,428 A | 4/1990 | Lin et al. | |
| 4,987,496 A | 1/1991 | Greivenkamp, Jr. | |
| 5,175,430 A | 12/1992 | Enke et al. | |
| 5,261,029 A | 11/1993 | Abi-Ezzi et al. | |
| 5,305,994 A | 4/1994 | Matsui et al. | |
| 5,387,983 A | 2/1995 | Sugiura et al. | |
| 5,475,430 A | 12/1995 | Hamada et al. | |
| 5,513,016 A | 4/1996 | Inoue | |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Joon Ki Paik, Yong Chul Park and Dong Wook Kim, "An Adaptive Motion Decision System for Digital Image Stabilizer Based on Edge Pattern Matching", IEEE Transactions on Consumer Electronics, vol. 38, No. 3, pp. 607-616, Aug. 1992.

(Continued)

*Primary Examiner* — Aung S Moe
*Assistant Examiner* — Yih-Sien Kao

(57) ABSTRACT

An image processor in an image capture device compensates for the effects of undesirable camera shakes occurring during video capture The image processor receives a pair of source frames representing images of a scene, generates a pair of subsampled frames from the source frames, and computes a coarse displacement of the captured image due to camera shakes by comparing the two subsampled frames. The image processor may then refine the determined coarse displacement by comparing the two source frames and a bound determined by an extent of subsampling, and compensate for the displacement accordingly. Display aberrations such as blank spaces caused due to shifting are also avoided by displaying only a portion of the captured image and shifting the displayed portion to compensate for camera shake. The image processor also recognizes displacements due to intentional camera movement, and does not correct for such displacements.

21 Claims, 11 Drawing Sheets

(56) References Cited

U.S. PATENT DOCUMENTS

| | | | |
|---|---|---|---|
| 5,608,824 A | 3/1997 | Shimizu et al. |
| 5,652,621 A | 7/1997 | Adams, Jr. et al. |
| 5,793,433 A | 8/1998 | Kim et al. |
| 5,878,174 A | 3/1999 | Stewart et al. |
| 5,903,273 A | 5/1999 | Mochizuki et al. |
| 5,905,530 A | 5/1999 | Yokota et al. |
| 5,995,109 A | 11/1999 | Goel et al. |
| 6,016,474 A | 1/2000 | Kim et al. |
| 6,078,331 A | 6/2000 | Pulli et al. |
| 6,111,988 A | 8/2000 | Horowitz et al. |
| 6,118,547 A | 9/2000 | Tanioka |
| 6,141,740 A | 10/2000 | Mahalingaiah et al. |
| 6,151,457 A | 11/2000 | Kawamoto |
| 6,175,430 B1 | 1/2001 | Ito |
| 6,252,611 B1 | 6/2001 | Kondo |
| 6,256,038 B1 | 7/2001 | Krishnamurthy |
| 6,281,931 B1 | 8/2001 | Tsao et al. |
| 6,289,103 B1 | 9/2001 | Sako et al. |
| 6,314,493 B1 | 11/2001 | Luick |
| 6,319,682 B1 | 11/2001 | Hochman |
| 6,323,934 B1 | 11/2001 | Enomoto |
| 6,392,216 B1 | 5/2002 | Peng-Tan |
| 6,396,397 B1 | 5/2002 | Bos et al. |
| 6,438,664 B1 | 8/2002 | McGrath et al. |
| 6,486,971 B1 | 11/2002 | Kawamoto |
| 6,504,952 B1 | 1/2003 | Takemura et al. |
| 6,584,202 B1 | 6/2003 | Montag et al. |
| 6,594,388 B1 | 7/2003 | Gindele et al. |
| 6,683,643 B1 | 1/2004 | Takayama et al. |
| 6,707,452 B1 | 3/2004 | Veach |
| 6,724,932 B1 | 4/2004 | Ito |
| 6,737,625 B2 | 5/2004 | Baharav et al. |
| 6,760,080 B1 | 7/2004 | Moddel et al. |
| 6,785,814 B1 | 8/2004 | Usami et al. |
| 6,806,452 B2 | 10/2004 | Bos et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,950,099 B2 | 9/2005 | Stollnitz et al. |
| 7,009,639 B1 | 3/2006 | Une et al. |
| 7,015,909 B1 | 3/2006 | Morgan, III et al. |
| 7,023,479 B2 | 4/2006 | Hiramatsu et al. |
| 7,088,388 B2 | 8/2006 | MacLean et al. |
| 7,092,018 B1 | 8/2006 | Watanabe |
| 7,106,368 B2 | 9/2006 | Daiku et al. |
| 7,133,041 B2 | 11/2006 | Kaufman et al. |
| 7,133,072 B2 | 11/2006 | Harada |
| 7,146,041 B2 | 12/2006 | Takahashi |
| 7,221,779 B2 * | 5/2007 | Kawakami et al. ............ 382/107 |
| 7,227,586 B2 | 6/2007 | Finlayson et al. |
| 7,245,319 B1 | 7/2007 | Enomoto |
| 7,305,148 B2 | 12/2007 | Spampinato et al. |
| 7,343,040 B2 | 3/2008 | Chanas et al. |
| 7,486,844 B2 | 2/2009 | Chang et al. |
| 7,502,505 B2 | 3/2009 | Malvar et al. |
| 7,580,070 B2 | 8/2009 | Yanof et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,912,279 B2 | 3/2011 | Hsu et al. |
| 8,049,789 B2 | 11/2011 | Innocent |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0018244 A1 | 2/2002 | Namizuka et al. |
| 2002/0027670 A1 | 3/2002 | Takahashi et al. |
| 2002/0033887 A1 | 3/2002 | Hieda et al. |
| 2002/0041383 A1 | 4/2002 | Lewis |
| 2002/0044778 A1 | 4/2002 | Suzuki |
| 2002/0054374 A1 | 5/2002 | Inoue et al. |
| 2002/0063802 A1 | 5/2002 | Gullichsen et al. |
| 2002/0105579 A1 | 8/2002 | Levine et al. |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 | 10/2002 | Daiku et al. |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 | 4/2003 | Fletcher et al. |
| 2003/0122825 A1 | 7/2003 | Kawamoto |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 | 9/2003 | Sogawa |
| 2003/0197701 A1 | 10/2003 | Teodosiadis et al. |
| 2003/0222995 A1 | 12/2003 | Kaplinsky et al. |
| 2003/0223007 A1 | 12/2003 | Takane |
| 2004/0001061 A1 | 1/2004 | Stollnitz et al. |
| 2004/0001234 A1 | 1/2004 | Curry et al. |
| 2004/0032516 A1 | 2/2004 | Kakarala |
| 2004/0066970 A1 | 4/2004 | Matsugu |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0189875 A1 | 9/2004 | Zhai et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0099418 A1 | 5/2005 | Cabral et al. |
| 2005/0185058 A1 * | 8/2005 | Sablak ............... 348/208.99 |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 * | 3/2006 | Faulkner et al. ............ 348/207.1 |
| 2006/0087509 A1 | 4/2006 | Ebert et al. |
| 2006/0133697 A1 | 6/2006 | Uvarov et al. |
| 2006/0176375 A1 | 8/2006 | Hwang et al. |
| 2006/0197664 A1 | 9/2006 | Zhang et al. |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0091188 A1 | 4/2007 | Chen et al. |
| 2007/0147706 A1 | 6/2007 | Sasaki et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2007/0285530 A1 | 12/2007 | Kim et al. |
| 2008/0030587 A1 | 2/2008 | Helbing |
| 2008/0062164 A1 | 3/2008 | Bassi et al. |
| 2008/0101690 A1 | 5/2008 | Hsu et al. |
| 2008/0143844 A1 | 6/2008 | Innocent |
| 2009/0010539 A1 | 1/2009 | Guarnera et al. |
| 2009/0116750 A1 | 5/2009 | Lee et al. |
| 2009/0160957 A1 | 6/2009 | Deng et al. |
| 2009/0257677 A1 | 10/2009 | Cabral et al. |
| 2010/0266201 A1 | 10/2010 | Cabral et al. |

FOREIGN PATENT DOCUMENTS

| | | |
|---|---|---|
| EP | 1449169 | 5/2003 |
| EP | 1378790 | 1/2004 |
| EP | 1447977 | 8/2004 |
| EP | 1550980 | 9/2005 |
| GB | 2045026 | 10/1980 |
| GB | 2363018 | 12/2001 |

(56) References Cited

FOREIGN PATENT DOCUMENTS

| | | |
|---|---|---|
| JP | 61187467 | 8/1986 |
| JP | 62151978 | 7/1987 |
| JP | 07015631 | 1/1995 |
| JP | 8036640 | 2/1996 |
| JP | 08079622 | 3/1996 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006025005 | 1/2006 |
| JP | 2006086822 | 3/2006 |
| JP | 2006094494 | 4/2006 |
| JP | 2006121612 | 5/2006 |
| JP | 2006134157 | 5/2006 |
| JP | 2007019959 | 1/2007 |
| JP | 2007148500 | 6/2007 |
| JP | 2009021962 | 7/2007 |
| JP | 2007233833 | 9/2007 |
| JP | 2007282158 | 10/2007 |
| JP | 2008085388 | 4/2008 |
| JP | 2008277926 | 11/2008 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | WO2007056459 | 5/2007 |
| WO | 2007093864 | 8/2007 |

OTHER PUBLICATIONS

S. Ertürk, Member and IEEE, "Digital Image Stabilization with Sub-Image Phase Correlation Based Global Motion Estimation", IEEE Transactions on Consumer Electronics, vol. 49, No. 4, pp. 1320-1325, Nov. 2003.

Sung-Jea Ko, Senior Member IEEE, Sung-Hee Lee and Kyung-Hoon Lee, "Digital Image Stabilizing Algorithms Based on Bit-Plane Matching", IEEE Transactions on Consumer Electronics, vol. 44, No. 3, pp. 617-622, Aug. 1998.

Sung-Jea Ko, Senior Member, IEEE, Sung-Hee Lee, Seung-Won Jeon and Eui-Sung Kang, "Fast Digital Image Stabilizer Based on Gray-Coded Bit-Plane Matching", IEEE Transactions on Consumer Electronics, vol. 45, No. 3, pp. 598-603, Aug. 1999.

Carlos Morimoto and Rama Chellappa, "Fast Electronic Digital Image Stabilization for Off-Road Navigation", Computer Vision Laboratory, Center for Automation Research University of Maryland, Real-Time Imaging, vol. 2, pp. 285-296, 1996.

Sarp Erturk, "Real-Time Digital Image Stabilization Using Kalman Filters", http://www.idealibrary.com, Real-Time Imaging 8, pp. 317-328, (2002).

Kenya Uomori, Atsushi Morimura and Hirofumi Ishii, "Electronic Image Stabilization System for Video Cameras and VCRS", J.Soc. Motion Pict. Telev. Eng., vol. 101, pp. 66-75, 1992.

Kenya Uomori, Atsushi Morimura, Hirofumi Ishii, Takashi Sakaguchi and Yoshinori Kitamura, "Automatic Image Stabilizing System by Full-Digital Signal Processing", vol. 36, No. 3, pp. 510-519, Aug. 1990.

D Doo, M. Sabin, "Behaviour of Recursive Division Surfaces Near Extraordinary Points", Sep. 1978; Computer Aided Design; vol. 10; pp. 356-360.

D. W. H. Doo, "A Subdivision Algorithm for Smoothing Down Irregular Shaped Polyhedrons", 1978; Interactive Techniques in Computer Aided Design; pp. 157-165.

Davis, J., Marschner, S., Garr, M., Levoy, M., Filling Holes In Complex Surfaces Using Volumetric Diffusion', Dec. 2001, Stanford University, pp. 1-9.

E. Catmull, J. Clark, "Recursively Generated B-Spline Surfaces On Arbitrary Topological Meshes", Nov. 1978I Computer Aided Design; vol. 10; pp. 350-355.

J. Bolz, P. Schroder, Rapid Evaluation of Catmull-Clark Subdivision Surfaces:, Web 3D '02.

J. Stam, "Exact Evaluation of Catmull-Clark Subdivision Surfaces At Arbitrary Parameter Values", Jul. 1998; Computer Graphics; vol. 32; pp. 395-404.

Krus, M., Bourdot, P., Osorio, A, Guisnel, F., Thibault, G.; "Adaptive Tessellation of Connected Primitives for Interactive Walkthroughs in Complex Industrial Virtual Environments", Jun. 1999, Proceedings of the Eurographics Workshop, pp. 1-10.

Loop, C., DeRose, T., "Generalized B-Spline Surfaces of Arbitrary Topology", Aug. 1990, Sigraph 90; pp. 347-356.

M. Halstead, M. Kass, T. DeRose, "Efficient, Fair Interpoloation Using Catmull-Clark Surfaces", Sep. 1993; Computer Graphics and Interactive Techniques, Proc; pp. 35-44.

T. DeRose, M. Kass, T. Truong; "Subdivision Surfaces in Character Animation", Jul. 1998; Computer Graphics and Interactive Techniques Proc, pp. 85-94.

Takeuchi, S., Kanai, T., Suzuki, H., Shimada, K., Kimura, F., "Subdivision Surface Fitting With QEM-Based Mesh. Simplification and Reconstruction of Approximated B-Spline Surfaces", 2000, Eighth Pacific Conference on Computer Graphics and Applicaitons, pp. 202-212.

Kumar, S., Manocha, D., "Interactive Display of Large Scale Trimmed NURBS Models", 1994, University of North Carolina at Chapel Hill, Technical Report, pp. 1-36.

"A Pipelined Architecture for Real-Time orrection of Barrel Distortion in Wide-Angle Camera Images", Hau, T. Ngo, Student Member, IEEE and Vijayan K. Asari, Senior Member IEEE, IEEE Transaction on Circuits and Sytstems for Video Technology: vol. 15 No. 3 Mar. 2005 pp. 436-444.

"Calibration and removal of lateral chromatic abberation in images" Mallon, et al. Science Direct Copyright 2006; 11 pages.

"Method of Color Interpolation in a Singe Sensor Color Camera Using Green Channel Seperation" Weerasighe, et al Visual Information Processing Lab, Motorola Austrailian Research Center pgs. IV-3233-IV3236, 2002.

Donald D. Spencer, "Illustrated Computer Graphics Dictionary", 1993, Camelot Publishing Company, p. 272.

Duca et al., "A Relational Debugging Engine for Graphics Pipeline, International Conference on Computer Graphics and Interactive Techniques", ACM SIGGRAPH Jul. 2005, pp. 453-463.

gDEBugger, graphicRemedy, http://www.gremedy.com, Aug. 8, 2006, pp. 1-18.

http://en.wikipedia.org/wiki/Bayer_filter; "Bayer Filter"; Wikipedia, the free encyclopedia; pp. 1-4.

http://en.wikipedia.org/wiki/Color_filter_array; "Color Filter Array"; Wikipedia, the free encyclopedia; pp. 1-5.

http://en.wikipedia.org/wiki/Color_space; "Color Space"; Wikipedia, the free encyclopedia; pp. 1-4.

http://en.wikipedia.org/wiki/Color_translation; "Color Management"; Wikipedia, the free encyclopedia; pp. 1-4.

http://en.wikipedia.org/wiki/Demosaicing; "Demosaicing"; Wikipedia, the free encyclopedia; pp. 1-5.

http://en.wikipedia.org/wiki/Half_tone; "Halftone"; Wikipedia, the free encyclopedia; pp. 1-5.

http://en.wikipedia.org/wiki/L*a*b*; "Lab Color Space"; Wikipedia, the free encyclopedia; pp. 1-4.

http://Slashdot.org/articles/07/09/06/1431217.html.

http:englishrussia.com/?p=1377.

Keith R. Slavin; Application as Filed entitled "Efficient Method for Reducing Noise and Blur in a Composite Still Image From a Rolling Shutter Camera"; U.S. Appl. No. 12/069,669, filed Feb. 11, 2008.

Kuno et al. "New Interpolation Method Using Discriminated Color Correlation For Digital Still Cameras" IEEE Transac. On Consumer Electronics, vol. 45, No. 1, Feb. 1999, pp. 259-267.

Parhami, Computer Arithmetic, Oxford University Press, Jun. 2000, pp. 413-418.

\* cited by examiner

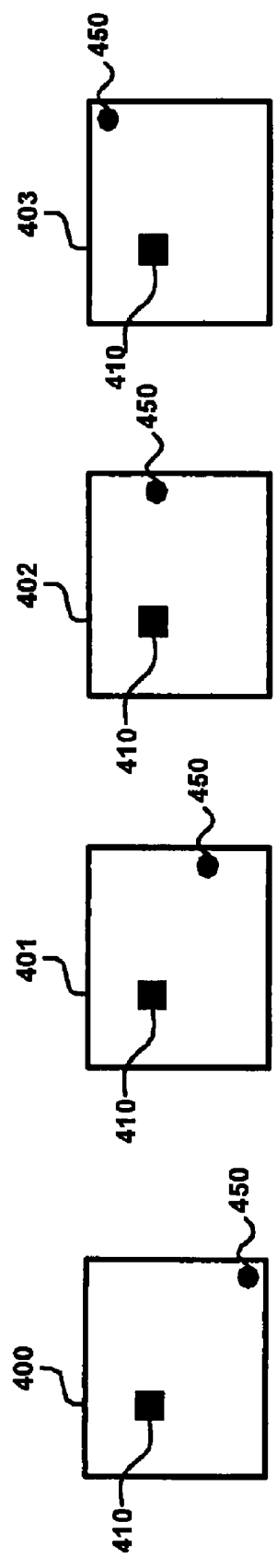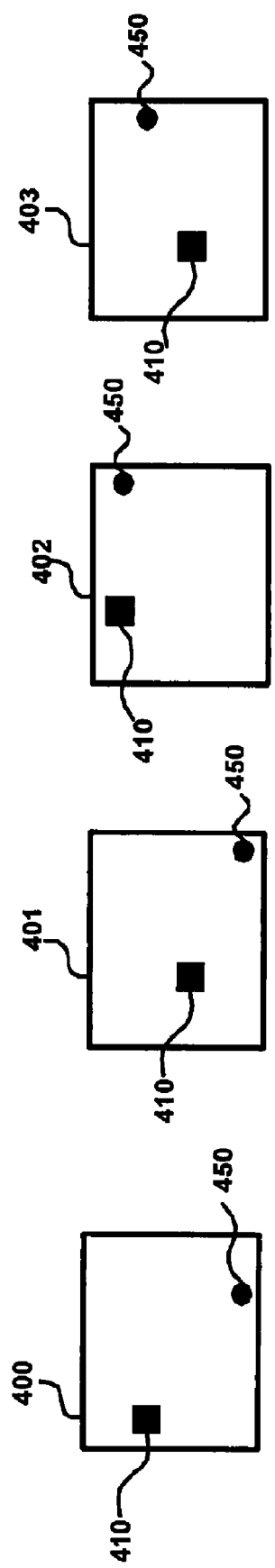

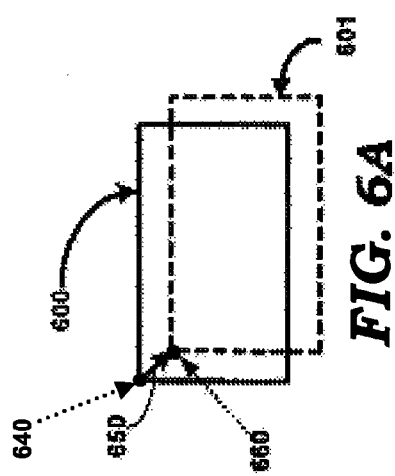
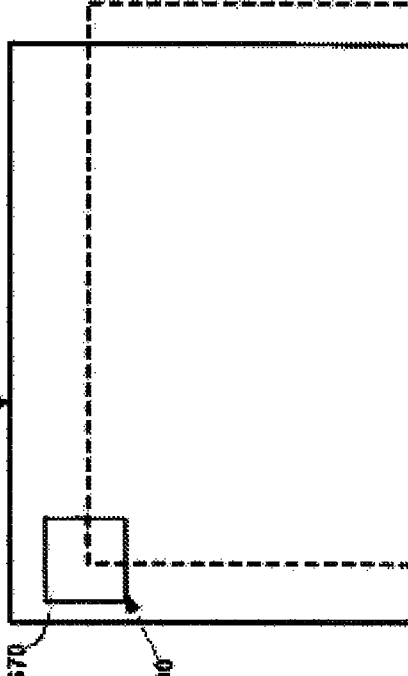
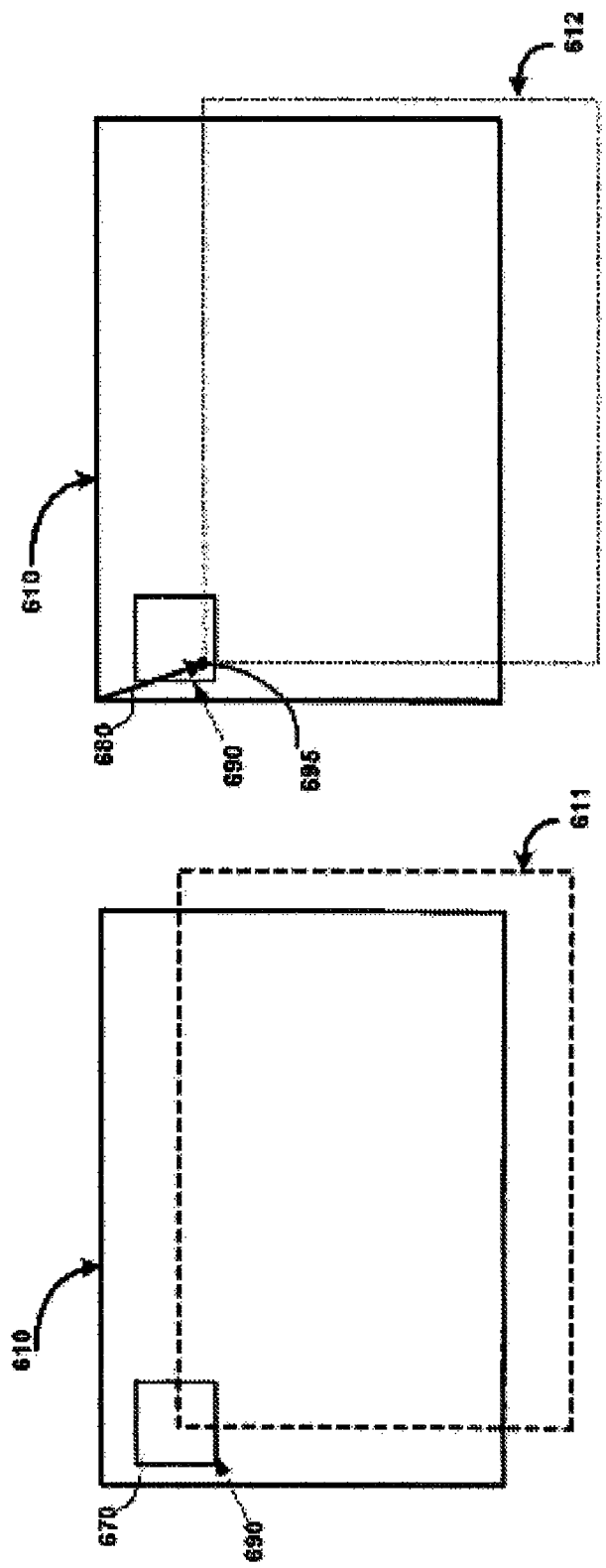

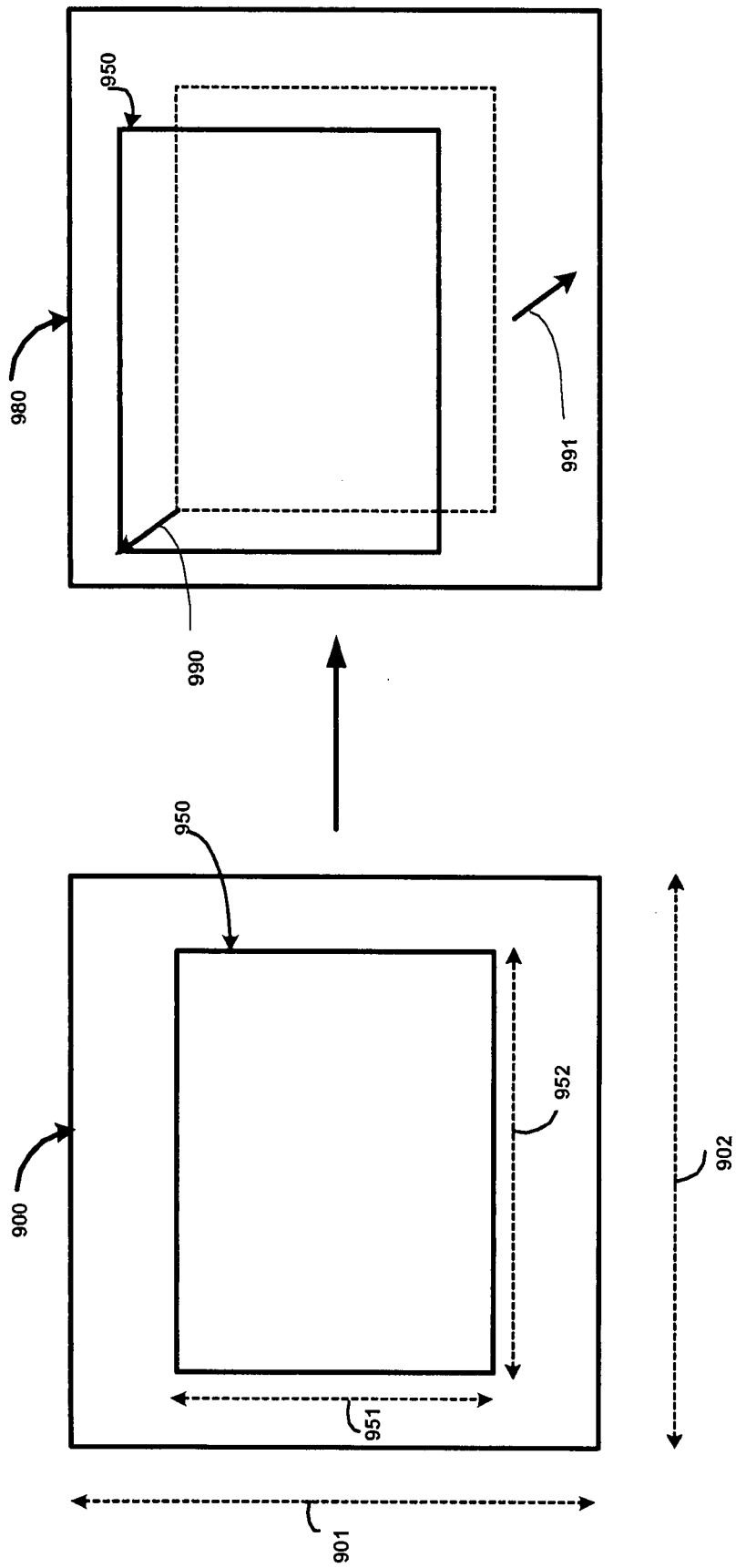

COMPENSATING FOR UNDESIRABLE CAMERA SHAKES DURING VIDEO CAPTURE

BACKGROUND

1. Field of Disclosure

The present disclosure relates generally to video cameras, and more specifically to techniques for compensating for undesirable camera shakes during video capture.

2. Related Art

A video camera (video acquisition device, in general) generally refers to a device, which is designed to continuously capture images of a scene, and generate successive frames (video sequences) of the images. The frames can be captured in digital form or analog form. Examples of video cameras include, but not limited to, consumer electronics which record the captured images on a storage medium and cameras used in broadcast television, where the captured images may not be stored, but simply transmitted for broadcasting.

One common problem while using video cameras is that the camera may be shaking when capturing the video sequences. For example, the hands holding a video camera may shake, causing the camera also to shake. Due to such camera shake, there is a relative motion between the video camera and the scene sought to be captured, even though both the user and the scene are otherwise stable. The relative motion can manifest as a sequence of frames which are spatially displaced, which is undesirable.

BRIEF DESCRIPTION OF THE DRAWINGS

Example embodiments will be described with reference to the following accompanying drawings, which are described briefly below.

FIGS. 4A through 4H are diagrams used to illustrate the effect of camera shake.

FIGS. 6A, 6B and 6C together illustrate the manner in which fine displacement may be determined from a coarse displacement and a bound defined by the extent of subsampling in one embodiment.

FIGS. 9A and 9B are diagrams used to illustrate the operation of the flowchart of FIG. 8 in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
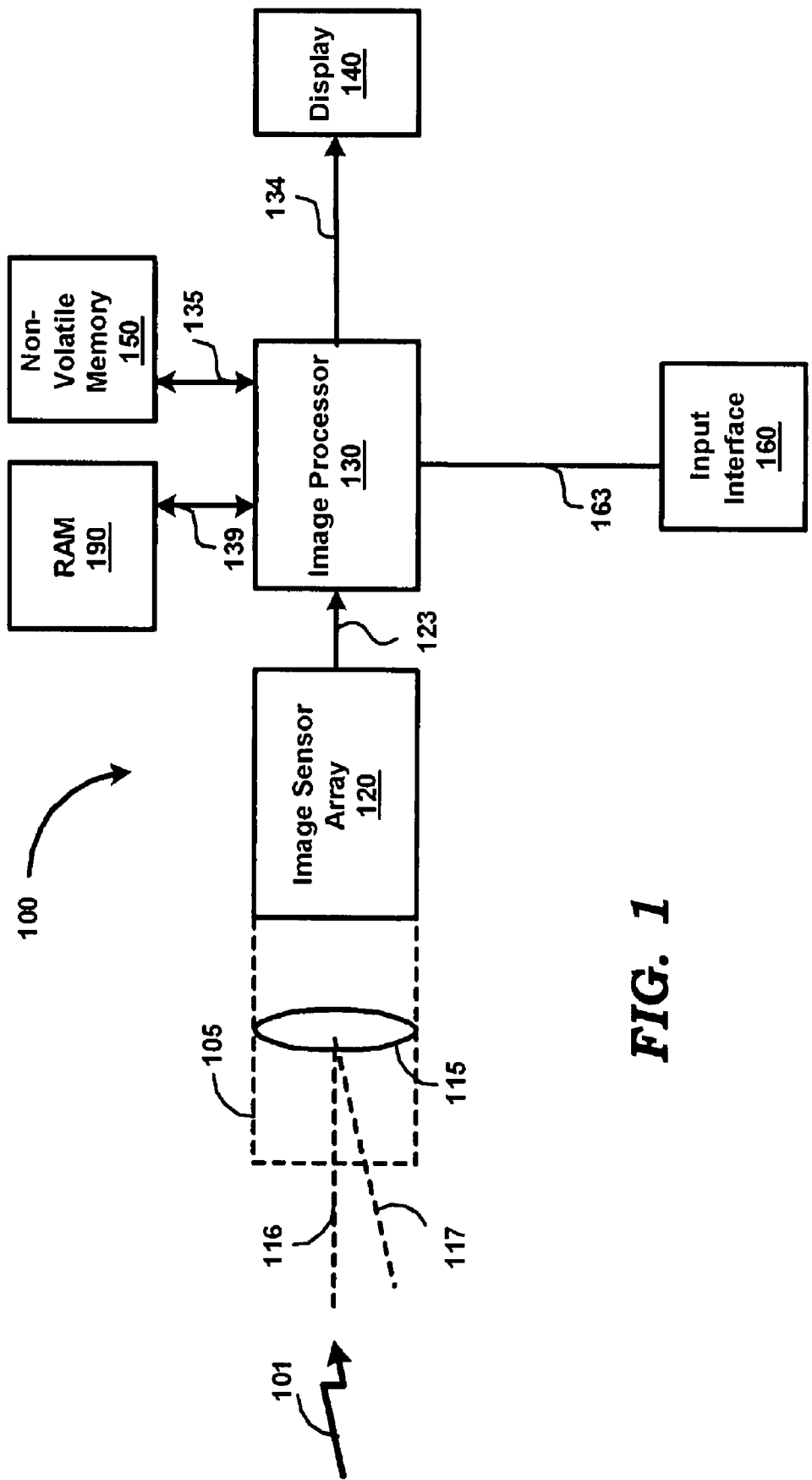
FIG. 1 is a block diagram of a video camera illustrating the details of an example embodiment in which several aspects of the present invention may be implemented.

An aspect of the present invention compensates for the effects of camera shakes during video capture. In an embodiment, a processor in a video capture device receives a first and a second source frames representing images of a scene, with the second source frame being captured at a later time instance compared to the first source frame. The processor generates a pair of subsampled frames from the source frames, and determines a coarse displacement of the captured image in the second frame relative to the first frame due to camera shakes by a matching process using the two subsampled frames.

The image processor then refines the determined coarse displacement by a similar matching process, but by using the two source frames and a bound determined by an extent of subsampling. Due to the use of the subsampled frames, the effect of local motion (i.e., with objects within a frame, actually moving in the scene) in determining displacement is reduced. In addition, the computational complexity of computing (coarse) displacement is also reduced. However, the accuracy of computation of displacement is maintained high by using the source frames in computing fine displacement.

Once such displacement is determined, the image in the second frame may be shifted by the opposite of (fine) displacement. One potential problem with such shifting is that there may not be sufficient pixel information at some of the boundaries of the shifted image, which may lead to blank space in the corresponding image portions. Display aberrations such as blank spaces caused due to shifting can also be avoided as described below.

According to another aspect of the present invention, a processor displays only a portion of the image in each frame lying within a display window. The display window is shifted by a vector opposite to the determined displacement, and only the portion of image lying within the (shifted display) window are displayed. Since the display window is smaller in size than the captured images, shifting may not cause display aberrations such as blank pixel areas in the scenario noted above.

According to yet another aspect of the invention, the image processor also identifies displacements due to intentional camera movement or when all the objects of the scene are moving, and does not compensate for such displacements. Such a situation is identified by checking for a uniform pattern in the displacements, and determining that compensation is not required when the uniform pattern is detected.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Definitions

The following includes definitions of selected terms used throughout the disclosure. Both singular and plural forms of all terms fall within each meaning:

Scene: A general area sought to be captured in video format

Image: The picture represented by the light captured by an image capture device

Frame: A set of pixel values representing a captured image viewed as a two dimensional area Pixel: A smallest picture element captured by the image capture device Pixel value: The value representing the brightness and color of a pixel Pixel location: The coordinates of the pixel in the frame

3. Video Camera

FIG. 1 is a block diagram of a video camera illustrating the details of an example embodiment in which several aspects of the present invention may be implemented. Video camera 100 is shown containing lens enclosure 105, lens assembly 115, image sensor array 120, image processor 130, display 140, non-volatile memory 150, input (I/P) interface 160, and RAM 190. Only the components as pertinent to an understanding of the operation of the example embodiment are included and described, for conciseness and ease of understanding. Each component of FIG. 1 is described in detail below.

Lens enclosure 105 (denoted by dotted lines) is shown housing lens assembly 115 and image sensor array 120, and is generally designed to shield extraneous (i.e., other than the light being received via the lens assembly) light from being incident on image sensor array 120 (in general, capturing medium). Lens assembly 115 may contain one or more lenses, which can be configured to focus light rays (denoted by arrow 101) from a scene to impinge on image sensor array 120.

Axis 116 (dotted lines) is representative of a position/direction at which video camera is desired to be fixed for capturing frames. However, as noted above, video camera 100 may shake while in the process of capturing frames, and axis 117 is representative of a changed position/orientation of video camera 100 due to such shake. (Axes 116 and 117 are shown shifted in vertical direction merely to simplify the description to follow, and video camera 100 may be shifted to any other position/orientation in space while capturing frames).

Display 140 displays image frames (video sequences) in response to the corresponding display signals received from image processor 130 on path 134. Display 140 may also receive various control signals (not shown) from image processor 130 indicating, for example, the pixel resolution to be used, etc. Display 140 is implemented as a LCD display in an embodiment.

Input interface 160 provides a user with the facility to provide inputs, for example, to select various features provided by video camera 100 such as indicating when to start recording video sequences (in case of consumer electronics). RAM 190 stores program (instructions) and/or data used by image processor 130. Specifically, pixel values (or entire frames) that are to be processed and/or to be used later, may be stored in RAM 190 via path 139 by image processor 130.

Non-volatile memory 150 stores image frames received from image processor 130 via path 135. The image frames may be retrieved from non-volatile memory 150 by image processor 130 and provided to display 140 for display. In an embodiment, non-volatile memory 150 is implemented as a flash memory. Alternatively, non-volatile memory 150 may be implemented as a removable plug-in card, thus allowing a user to move the captured images to another system for viewing, processing or to use other instances of plug-in cards.

Non-volatile memory 150 may contain an additional memory unit (e.g., ROM, EEPROM, etc.), which store various instructions, which when executed by image processor 130 provide various features of the invention described herein. In general, such memory units (including RAMs, non-volatile memory, removable or not) from which instructions can be retrieved and executed by processors are referred to as a computer/machine readable medium.

Image sensor array 120 may contain an array of sensors, with each sensor generating an output value representing the corresponding point (small portion or pixel) of the image, and proportionate to the amount of light that is allowed to fall on the sensor. The output of each sensor may be provided as a corresponding digital value (for example, in RGB format). Digital values representing video sequences (frames) produced by the sensors are forwarded on path 123 to image processor 130 for further processing.

In particular, merely to aid the description to follow, it is assumed that due to video camera shake, image sensor array 120 captures some frames when video camera 100 is oriented along axis 116, and some other frames when video camera 100 is oriented along axis 117. Thus, it may be appreciated that due to the relative motion (due to camera shake) between video camera 100 (as also image sensor array 120) and scene 101, stationary objects (e.g., background of scene) in the scene captured when video camera 100 is oriented along axis 116 may be located at a position(s) different from their respective corresponding position(s) when video camera 100 is oriented along axis 117.

Image processor 130 forwards pixel values received on path 123 to path 134 to enable a user to view the scene presently pointed by the camera. Further, when the user indicates intent to start recording images (via input interface 160), image processor 130 causes the pixel values (of corresponding image frames) to be stored in memory 150.

In addition, image processor 130 may operate to compensate for camera shake according to several aspects of the present invention, and the description is accordingly continued with the internal details of image processor 130 in one embodiment.

4. Image Processor

Figure 2:
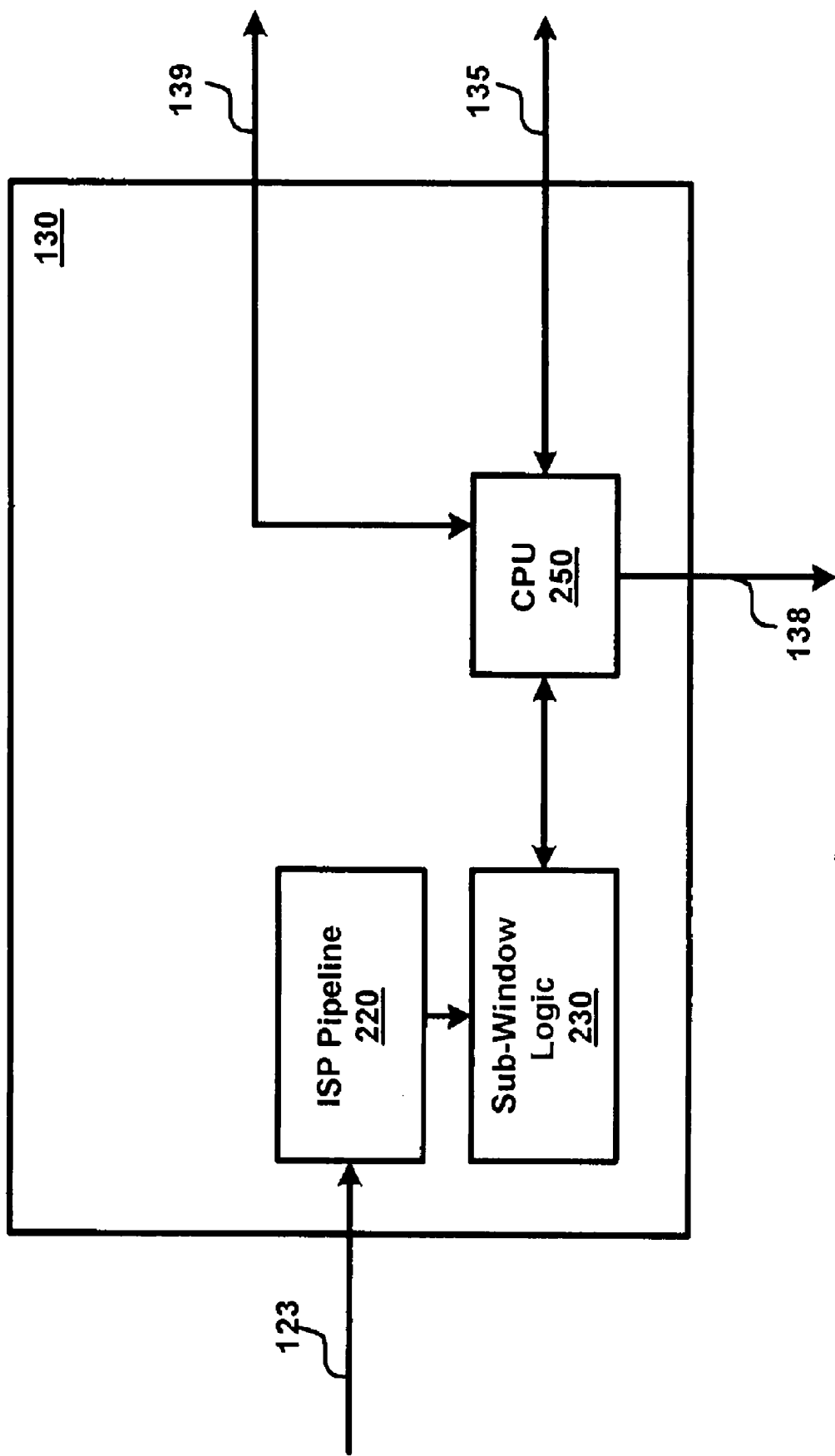
FIG. 2 is a block diagram of the internal details of an image processor operating to compensate for camera shakes during video capture, in one embodiment.

FIG. 2 is a block diagram of image processor 130 in one embodiment. Merely for illustration, several features are described below with respect to the components of FIG. 2. However the features can be implemented in various other processors/devices and environments as well, without departing from the scope and spirit of several aspects of the present invention. Image processor 130 is shown containing image signal processor (ISP) pipeline 220, sub-window logic 230, and central processing unit (CPU) 250. Image processor 130 may contain other components/blocks also, but are not shown as not being relevant to an understanding of the described embodiment. Each component is described in detail below.

ISP pipeline 220 receives a stream of pixel values (source values) corresponding to frames (row wise) on path 123. The pixel values may be received directly from image sensor array 120 (of FIG. 1). ISP pipeline 220 may be implemented as a shift register, and shifts in pixels received on path 123, and transfers the pixels to buffer registers or other internal buffer, from which CPU 250 may retrieve pixel values via sub-window logic 230. ISP pipeline 220 may perform various operations on the stored pixels such as optical black restoration (subtracting a black color reference level from each of the pixels), sensor linearization (which removes non-linear effects of image sensor array 120), auto-white balance, color correction (transformation of pixel values from one color space to another specific color space), gamma correction, demosaicing (individual R/G/B pixel signals obtained from Bayer color filter array converted to simultaneous R/G/B component values), etc.

Sub-window logic 230 receives control inputs from CPU 250 specifying dimensions and locations of one or more sub-windows (e.g., in the form of rectangular areas) in the captured image that are to be subsampled. For each of a group (for example, nine adjacent pixels) of pixel values in the sub-window, sub-window logic 230 computes the average of the pixel values in the group, and generates a corresponding single pixel value having the computed average value. The 'averaged' pixels thus generated form a subsampled version of portion of the image in the sub-window, and the sub-sampled version is provided by sub-window logic 230 to CPU 250. In an embodiment, sub-window logic 230 provides a 64×64 pixel wide subsampled version of (entire) images captured by image sensor array 120, and provides them to CPU 250.

CPU 250 may then operate on the subsampled image(s) as well as the source images (prior to subsampling) to stabilize the video images, as described in detail below. The manner in which CPU 250 may process the image frames to compensate for camera shake, is described below with respect to an example embodiment.

5. Compensation for Camera Shake

Figure 3:
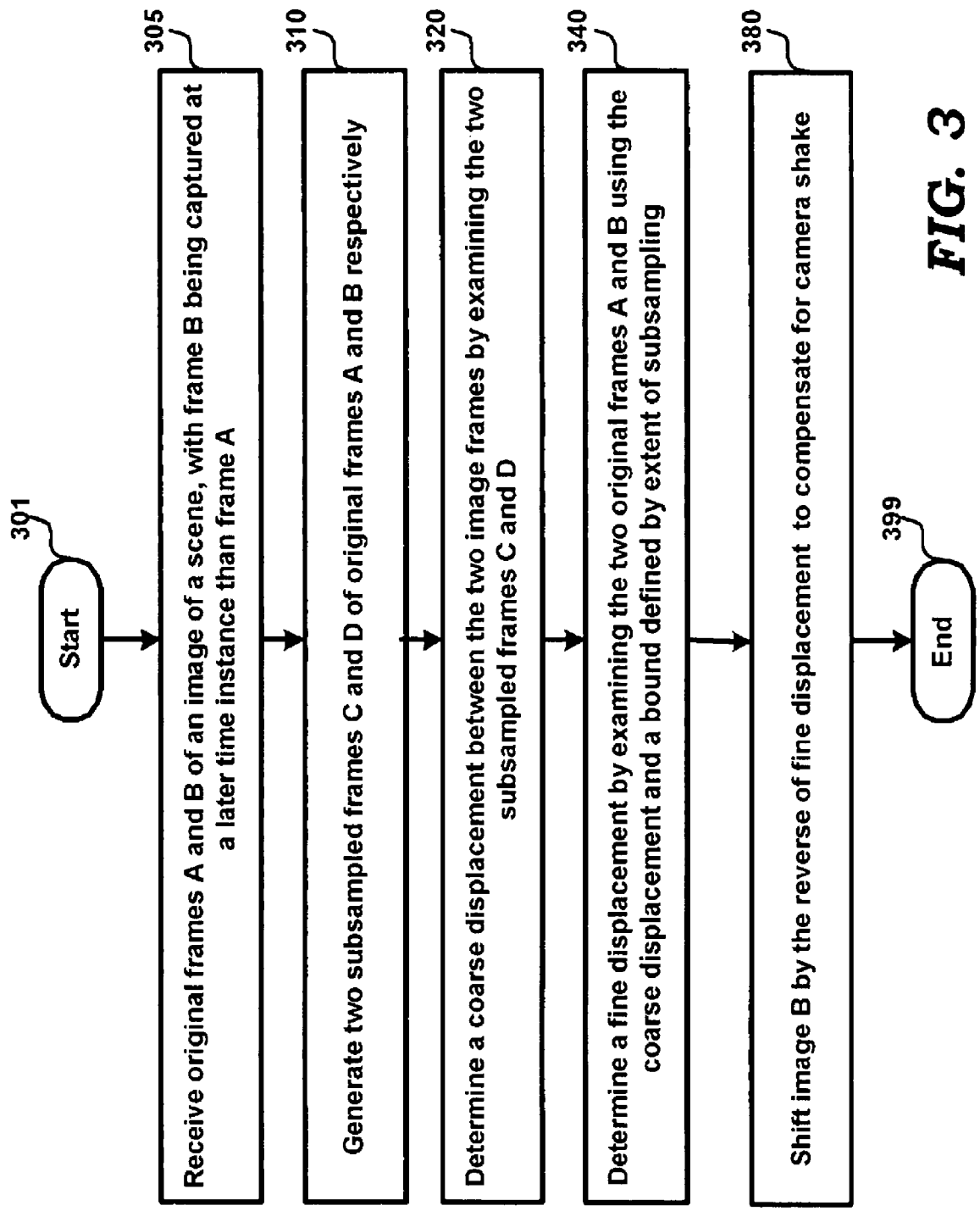
FIG. 3 is a flowchart illustrating the manner in which camera shake may be compensated for, to obtain stable video images in one embodiment.

FIG. 3 is a flowchart illustrating the manner in which camera shake may be compensated for, to obtain stable video images in one embodiment. The flowchart is described with respect to FIGS. 1 and 2, and in relation to the components of image processor 130, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 305, ISP pipeline 220 receives two original (source) frames A and B of an image of a scene. As noted above, due to camera shake different frames may be captured at different positions/orientations of video camera 100. Thus, Frame A is assumed to be captured with video camera 100 oriented along axis 116, while Frame B is captured when video camera 100 is oriented along axis 117. Frame B is assumed to be captured at a later time instance than frame A for illustration. In one embodiment, Frames A and B are successive frames, with Frame B being captured after Frame A, even though frames received at regular intervals (example every 8$^{th}$ frame) can be analyzed, for example, to reduce the computational requirements. Control then passes to step 320.

In step 310, sub-window logic 230 generates two sub-sampled frames C and D of original frames A and B respectively. ISP pipeline may communicate to CPU 250 the receipt of original frames A and B, and CPU 250 may then issue a command to sub-window logic 230 to perform subsampling on each of the frames A and B to generate subsampled frames C and D. Sub-window logic 230 provides the subsampled frames C and D to CPU 250. In an embodiment (described below), each of subsampled images C and D has a size of 64×64 pixels and the source images have a size of 800×600 pixels. Control then passes to step 320.

In step 320, CPU 250 determines a displacement ("coarse displacement") at a coarse resolution between the two original image frames A and B by examining the two subsampled frames C and D. The coarse resolution is due to the operation using the subsampled images. In an embodiment described in detail below, CPU 250 selects a center 48×48 block in frame D, and searches for a maximum correlation (most similar) 48×48 block in frame C. The displacement (vector offset) between the two 48×48 blocks is a coarse estimation of the displacement (coarse displacement) between the two original images A and B due to camera shake. In an embodiment, the matching process is performed using the "3 Step Search for fast motion vector estimation" approach, as described further in the document entitled "Motion-compensated inter-frame coding for video conferencing," by T. Koga, et al, in Proc. NTC81, New Orleans, La., November 1981, pp. C9.6.1-9.6.5. However, various other approaches can also be used in determining the coarse displacement. Control then passes to step 340.

In step 340, CPU 250 determines a displacement ("fine displacement") at finer resolution by examining the two original frames and using the coarse displacement estimated in step 320 and a bound defined by the extent of subsampling. In general, the bound is larger when the subsampling factor (i.e., the number of pixels in the source image used to generate a single pixel of the subsampled image) is higher. In one embodiment, the fine displacement is also determined using the "3 Step Search for fast motion vector estimation" approach noted above, but by constraining the search locations by the bound. The manner in which the fine and coarse displacements are computed is described with illustrative examples below. Control then passes to step 380.

In step 380, CPU 250 shifts image B by the reverse of the fine displacement. Assuming that the displacement is computed as a vector having X and Y coordinates, for example, as (aX+bY), the shifting is performed by (−aX+−bY), wherein a and b are any real numbers, and X and Y are unit vectors along the X-axis (horizontal direction) and Y-axis (vertical direction) respectively. The shifting can be accomplished by various techniques as will be apparent to one skilled in the relevant arts, even though specific approaches are described in sections below.

Control then passes to step 399 in which the flowchart ends. It should be appreciated that the flowchart of FIG. 3 can be repeated for every successive pair of images, though described with respect to a single pair for illustration. If the pair of images are not successive, the displacement computed for one pair can be used to correct all the intermediate frames as well.

Though the description above is provided as being performed within a video camera, it should be appreciated that at least some of the operations can be performed external to the video camera (e.g., in a broadcasting type scenario where the images are corrected in a path from the video camera to the broadcasting equipment).

The operation of the steps above are clarified below with the help of example illustrations. First, camera shake is illustrated in an example scenario.

6. Camera Shake

FIGS. 4A through 4H illustrate the effect of camera shake. FIGS. 4A-4D illustrate a scenario when images are captured without camera shake, while FIGS. 4E-4H illustrate a scenario when the same images are captured with camera shake.

For each scenario four successive frames are shown. In each of the FIGS. 4A through 4H, object 410 (or pixels representing the object) is assumed to be a stationary object, while object 450 is assumed to be moving in an upward direction with constant speed.

In FIGS. 4A through 4D, the position of object 410 is shown as being substantially the same in each of successive frames 400 through 403 since the object is stationary and there is no camera shake. Object 450 is shown located at a corresponding position in each frame reflecting its movement in the upward direction.

When there is camera shake when frames are captured, the position of object 410 may be different (i.e., displaced) in successive frames, as illustrated by frames 404 through 407 (FIGS. 4E through 4H respectively). Object 450 is again shown located at a corresponding position in each frame reflecting its movement in the upward direction as well as camera shake.

Various aspects of the current invention operate to compensate for the undesirable effects of camera shake. As noted above with respect to the flowchart of FIG. 3, image processor 130 (or components within it) generates subsampled frames from original frames received to first determine a coarse displacement. The description is accordingly continued with an illustration of subsampling.

7. Subsampling

Figure 5B:
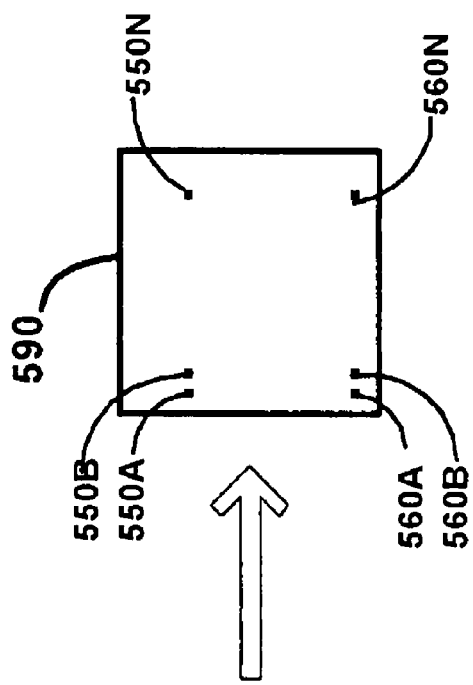
FIGS. 5A and 5B are diagrams used to illustrate subsampling in one embodiment.
Figure 5A:
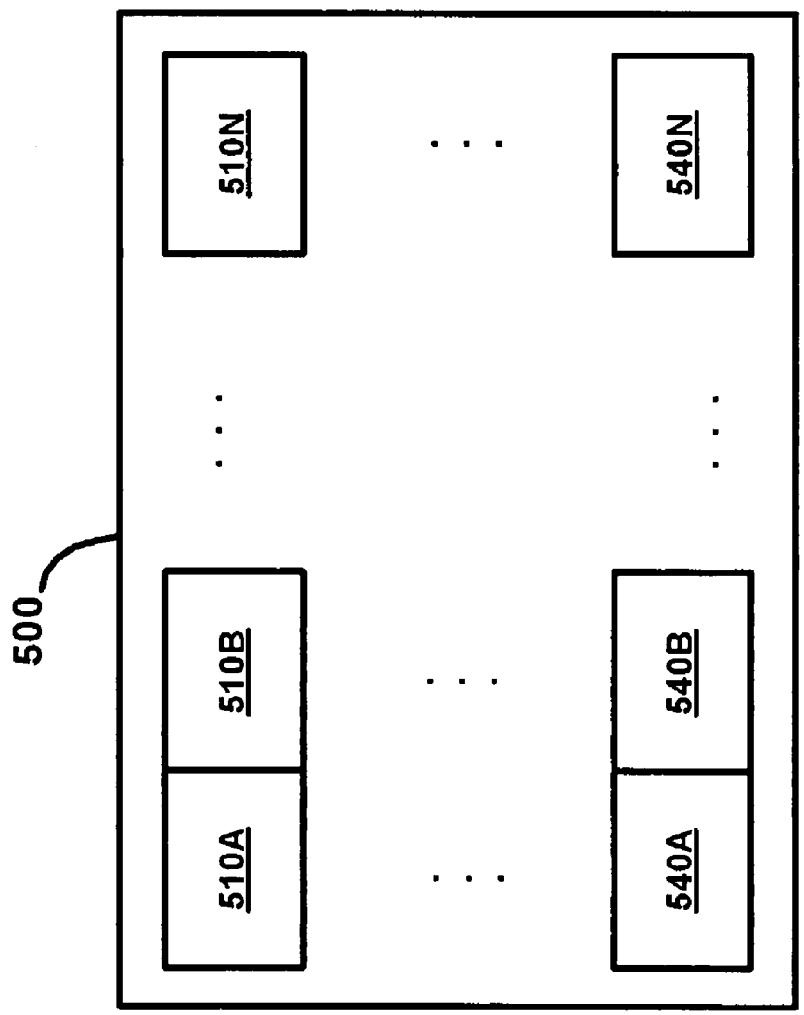

FIG. 5A shows an original frame 500 and a subsampled frame 590 generated from the original frame 500. Pixels in frame 500 are shown grouped in blocks 510A through 510N, 540A through 540N etc (all blocks not shown), with each group representing a set of adjacent pixels in a rectangular/square area.

In an embodiment, sub-window logic 230 (under control from CPU 250) computes an average of the pixels values in a block and generates a pixel with the computed average value. However other approaches such as pixel dropping, filtering using Laplacian pyramid, Gaussian Pyramid etc., can be used to generate the subsampled image. Pixels thus generated constitute the subsampled frame 590.

Thus, pixel 550A shown in FIG. 5B has a value which is the average of the pixel values of pixels in block 510A. Similarly, pixel 560N shown in FIG. 5B has a value which is the average of the pixel values of pixels in block 540N, and so on.

In an embodiment each of blocks 510A-510N through 540A-540N is 8×8 pixels wide, Consequently, for original frames A and B which may be 800×600 pixels in size, subsampled frames C and D generated are 64×64 pixels in size.

As noted above, image processor 130 (or components within it) receives two original frames A and B, and generates corresponding subsampled frames C and D according to approaches described above. In an embodiment, CPU 250 determines a coarse displacement between the two original image frames A and B by examining the two subsampled frames C and D. CPU 250 then determines a "fine displacement" at a finer resolution by examining the two original frames A and B, and by using the coarse displacement and a bound defined by the extent of subsampling, as described next with examples.

8. Determining Fine Displacement

FIGS. 6A, 6B and 6C together illustrate the manner in which CPU 250 determines fine displacement from the coarse displacement and a bound defined by the extent of subsampling in one embodiment. In each of the Figures, two image frames (one with continuous lines and another with broken lines) are shown. The image frame with the continuous lines represents a first frame and the image frame with the broken lines represents a 'logically' shifted frame due to the camera shake. The manner in which such shift is countered according to an aspect of the present invention, is described below.

With respect to FIG. 6A, frames 600 and 601 represent the subsampled frames C and D noted in the above description, and vector 650 (between two similar points 640 and 660 of frames C and D respectively) represents a shift determined by CPU 250 between subsampled frames C and D. Since the displacement is determined based on subsampled frames, the magnitude of vector 650 needs to be scaled by a factor determined by the ratio of the source image (i.e., image without subsampling) to the subsampled image (as an example, the ratio of size of image 500 to size of corresponding subsampled image 590, illustrated with respect to FIGS. 5A and 5B). As an example, for an original (source) image frame of size M×N pixels, and a subsampled image size of 64×64 pixels, the scaling factor would be M/64 in the horizontal (X axis) direction and N/64 in the vertical (Y axis) direction.

It should be appreciated that since such a scaled vector is computed based on subsampled images, and since subsampled images have a coarser resolution than the corresponding source images, the scaled vector may be associated with an error. Thus, the scaled vector may be refined, and the displacement at fine (or equivalently source) resolution can be determined based on the below description.

FIG. 6B represents the positioning of source frames 610 and 611 (A and B respectively in the illustrative example above) corresponding to the scenario of FIG. 6A, taking merely the coarse displacement into account. As may be readily understood, point 660 represents block 690 (having dimensions of 3×3 in the illustrative example), and the specific pixel location corresponding to point 660 can be in any of the pixel locations within block 690.

Accordingly, the search to determine the displacement with finer resolution may need utmost 9 searches corresponding to each pixel position within block 690. However, optimized approaches can be used to reduce the number of searches. Furthermore, assuming any errors in the computations of displacement vector 650, additional searches to surround more pixel positions (than block 690) can be performed.

Assuming such searches indicate that the top left corner point has moved to pixel position 695, the source frames 610 (A) and 612 (B) with the fine displacement are shown represented in FIG. 6C.

Though the description above is provided at a logical level depicting the relative movement of images (represented by corresponding frames), it should be appreciated that image processor 130 performs computations using the received set of pixels to determine the coarse and fine displacements. The FIGS. 6A-6C represent the logical views formed based on such determinations.

Once the fine displacement (relative to a compared previous frame) is determined for a present frame, the present frame is shifted by the opposite of the determined refined displacement (represented by vector 680 in FIG. 6C). Some example approaches to such shifting are described below.

9. Shifting Image Frames

Figure 7:
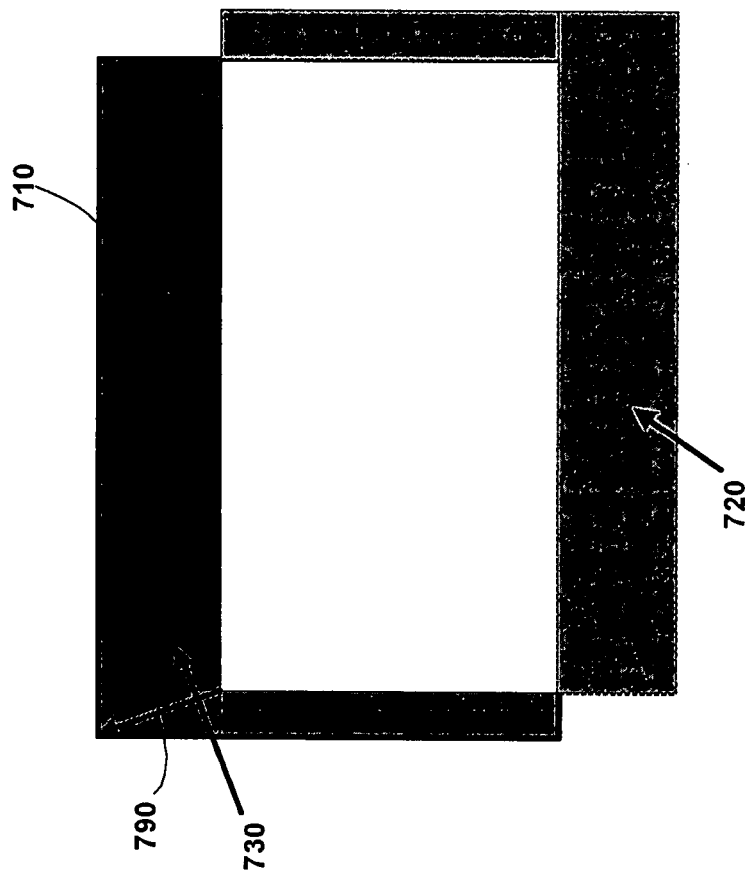
FIG. 7 is a diagram illustrating how display aberrations may be caused when shifting an image.

FIG. 7 illustrates a scenario when the image in frame B is to be shifted by vector 790 (opposite of vector 680 in FIG. 6C). Here, frame 710 represents a captured frame, which is to be shifted by vector 790. Due to the shifting, the pixels in shaded area 730 (shown with crossed lines) would be shifted out (and thus may not be available for display).

On the other hand, there may not be sufficient data for shaded area 720 (with parallel lines only) and thus may be displayed as blank pixels (or any other values, either with processing such as interpolation, or otherwise). Such display aberration is generally undesirable.

An aspect of the present invention facilitates such display aberrations to be avoided as described below.

10. Avoiding Display Aberrations while Shifting

Figure 8:
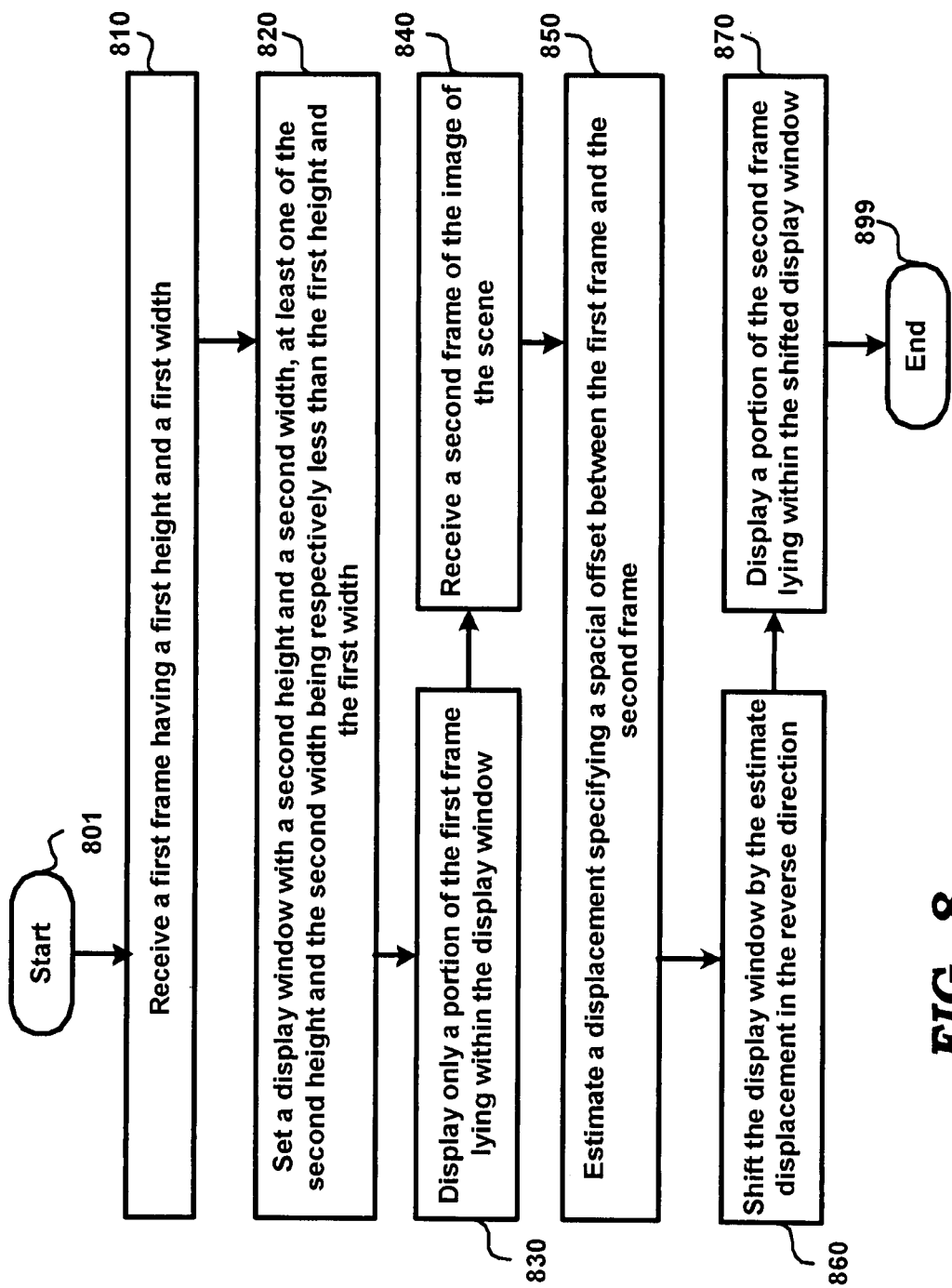
FIG. 8 is a flowchart illustrating the manner in which display aberrations possible when shifting images may be avoided in one embodiment.

FIG. 8 is a flowchart illustrating the manner in which display aberrations noted above are avoided in one embodiment. The flowchart is described with respect to FIGS. 1 and 2, and in relation to the components of image processor 130, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 801, in which control passes immediately to step 810.

In step 810, image processor 130 receives a first frame having a first height and a first width. As may be appreciated, each frame contains pixels organized as rows and columns, with each pixel being represented in formats such as RGB or YUV, well known in the relevant arts. Control then passes to step 820.

In step 820, image processor sets a display window with a second height and a second width, with at least one of the second height and the second width being respectively less than the first height and the first width. In general, both width and height would be less, assuming that compensation is to be performed in both horizontal and vertical directions respectively. Also, the degree by which each dimension would be less is determined by the maximum handshake (in that dimension) for which compensation is to be designed. Control then passes to step 830.

In step 830, image processor 130 displays only a portion of the first frame lying within the display window. Control then passes to step 840. In step 840, image processor 130 receives a second frame of the image of the scene. Control then passes to step 840.

In step 850, image processor 130 estimates a displacement vector specifying a spatial offset between the first frame and the second frame. The displacement may be determined in a manner described above. Control then passes to step 860.

In step 860, image processor 130 shifts the display window in the reverse direction of the estimated displacement vector. Control then passes to step 870. In step 870, image processor 130 displays a portion of the second frame lying within the shifted display window. Control then passes to step 899, in which the flowchart ends.

Due to the shifting of the display window, the same portion of the scene may be displayed irrespective of the camera shake. The operation of the steps described above are illustrated with respect to FIGS. 9A and 9B.

In FIG. 9A block 900 represents a first frame received by image processor 130, and having height 901 and width 902. Block 950 represents the display window having a height 951 and width 952. In the example shown in FIG. 9A both the height and width of the display window 950 are smaller than the height and width respectively of frame 900. Image processor 130 displays only the portion of frame 900 lying within display window 950.

FIG. 9B shows a second frame 980 received by image processor 130. Frame 980 has the same dimensions as frame 900. By comparing the frames 900 and 980, it is assumed that image processor 130 has computed a displacement represented by vector 991. Accordingly, image processor 130 shifts the display window 950 in reverse direction of the estimated displacement vector 991, as indicated by movement vector 990. Image processor 130 then displays only that portion of the image in frame 980 that lies within the shifted display window 950. Merely for illustration, the previous position of display window 950 (as in FIG. 9A) is shown in dotted lines.

It may clearly be seen that, since the captured (received) image frames are larger than the displayed portions, display aberrations such as blank pixel areas would not occur. Thus, the undesirable effects due to camera shakes during video capture may be compensated for.

There may, however, be scenarios where a movement of the camera during video capture is intentional (e.g., either because the camera is being panned gradually to cover adjacent portions or because all the objects of the scene itself are moving). This is illustrated next with an example.

11. Intentional Movement

Figure 10A:
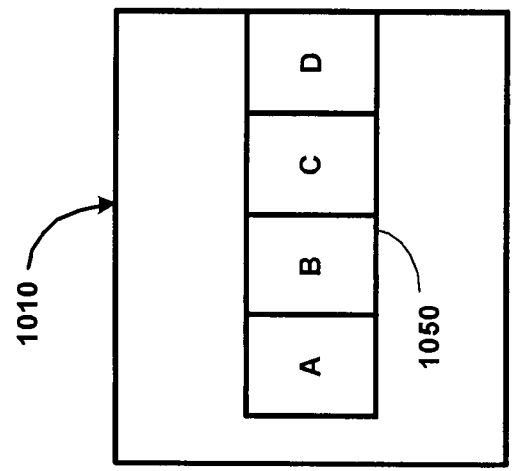
FIGS. 10A, 10B and 10C are diagrams illustrating camera panning.
Figure 10B:
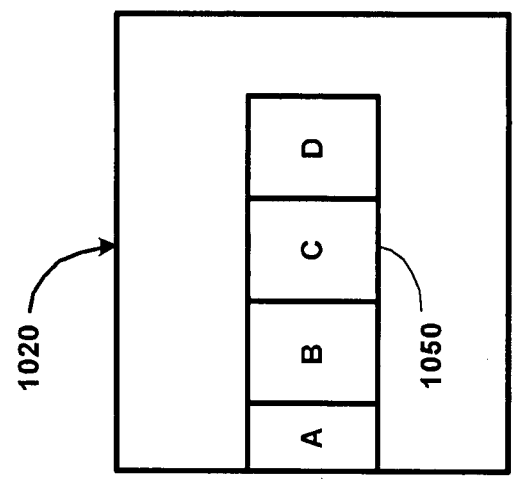
Figure 10C:
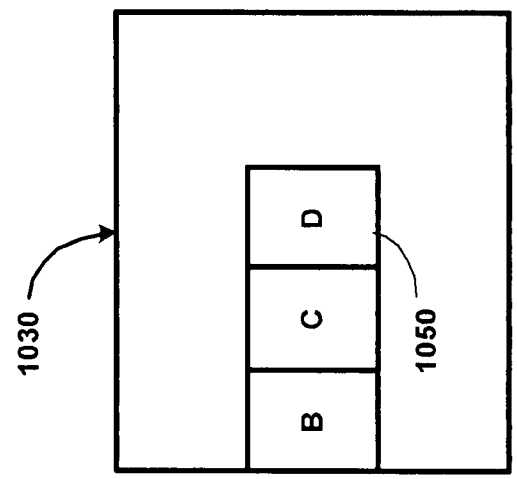

FIGS. 10A, 10B and 10C are diagrams illustrating camera panning. It may be seen from the figures that due to deliberate camera movement (panning) in a direction from left to right, image 1050 appears to be displaced towards the left in successive frames 1010, 1020 and 1030. Such a displacement is due to intentional camera movement, and need not be compensated for.

Figure 11:
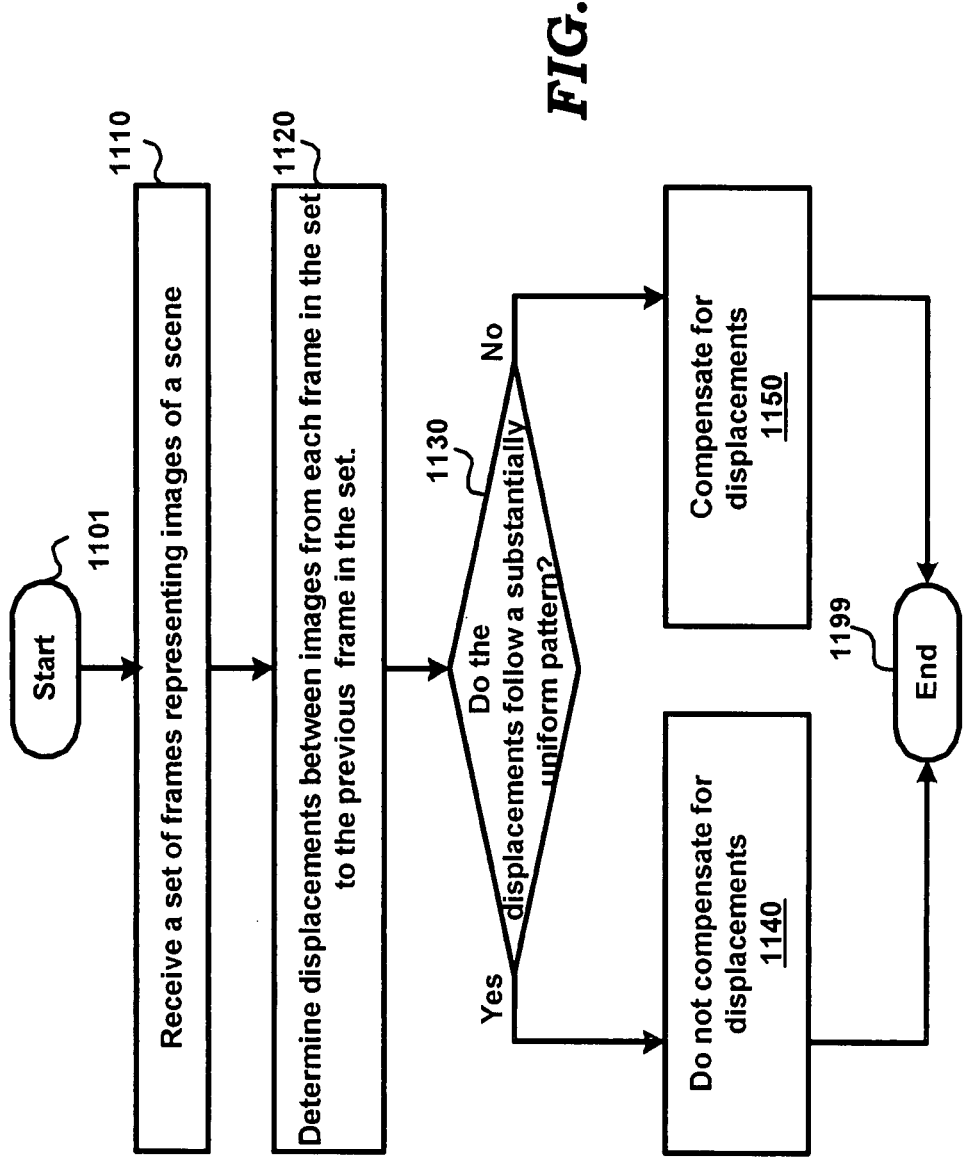
FIG. 11 is a flowchart illustrating the manner in which image displacements due to intentional relative movement between camera and scenes may be recognized and accounted for, in one embodiment.

The manner in which image processor 130 recognizes such intentional camera movement, and keeps from compensating for image displacements in such a scenario is described below with respect to the flowchart of FIG. 11. While not noted specifically in the description below, image processor 130 may choose to operate on subsampled frames similar to the manner described in sections above. Again, the flowchart is described with respect to FIGS. 1 and 2, and in relation to the components of image processor 130, merely for illustration. However, various features can be implemented in other environments and other components. Furthermore, the steps are described in a specific sequence merely for illustration. The flowchart starts in step 1101, in which control passes immediately to step 1110.

In step 1110, image processor 130 receives a set of frames representing images of a scene. The set may contain successive frames, or every nth (n being an integer) frame captured. In an embodiment, the displacements corresponding to the last 5 frames (preceding the current frame) are recorded (stored). Control then passes to step 1120.

In step 1120, image processor 130 determines displacements between images from each frame in the set to the previous frame in the set. Thus, for example, if there are 10 successive frames in the set, image processor 130 may determine the displacement between each frame and a previous frame, i.e., nine displacements in all. In each instance, the displacement may be determined as described in sections above. Control then passes to step 1130.

In step 1130, image processor 130 determines whether the displacements follow a substantially uniform pattern. In general, if the displacements are due to actual relative movement of the camera and scenes, then the displacements in images in successive frame pairs would tend to be similar. For example, the displacements may following a pattern, in terms of magnitude and/or direction. The pattern may represent, for example, constant changes, changes with increasing/decreasing constant differences, clockwise/anti-clockwise rotational changes with constant direction changes etc. This may be appreciated from the example illustration in FIGS. 10A, 10B and 10C, wherein the displacements of image 1050 may be seen to be of substantially the same direction. On the other hand, if the displacements are more or less random in nature, such as illustrated in FIGS. 4E through 4H, image processor 130 may conclude that the displacements have been caused by undesirable camera shake. If image processor 130 concludes that the displacements follow a pattern, control passes to step 1140, else control passes to step 1150.

In step 1140, image processor 130 determines that compensation for displacements is not required. Hence frames are displayed as they are received, without the shifting described above with respect to FIG. 9B. Control then passes to step 1199, in which the flowchart ends.

In step 1150, image processor 130 compensates for the displacements by shifting each frame by a displacement vector determined as described in sections above. Control then passes to step 1199, in which the flowchart ends.

Thus, using combinations of various techniques described above, video images free of the effects of camera shake can be generated.

12. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of obtaining stable video images of a scene using a video camera, said method comprising:
    receiving a first source frame and a second source frame, wherein said first source frame and said second source frame respectively represent a first image and a second image of a scene captured at different time instances;
    generating a first subsampled frame from a first set of pixels in said first source frame and a second subsampled frame from a second set of pixels in said second source frame;
    computing a displacement of said second image relative to said first image;
    refining said displacement by searching a plurality of pixel locations within said first and second sets of pixels in said first and second source frames for a correspondence to said first and second subsampled frames;
    determining if said displacement is an intentional displacement by checking whether said sequence of displacements follows a uniform pattern; and
    shifting said second source frame by an opposite of said displacement when said sequence of displacements does not follow a uniform pattern.

2. The method of claim 1, wherein said computing comprises:
    calculating a second displacement by scaling said first displacement for said first and second source frames;
    estimating a first displacement from said first subsampled frame and said second subsampled frame; and
    calculating a second displacement by scaling said first displacement for said first and second source frames, said second displacement having a higher resolution than said first displacement.

3. The method of claim 2, wherein said higher resolution comprises a resolution equivalent to a resolution of the first and second source frames.

4. A method of obtaining stable video images of a scene using a video camera, said method comprising:
    receiving a first set of pixel values representing a first image;
    displaying a first area which covers only a first portion of said first image;
    receiving a second set of pixel values representing a second image;
    determining a displacement of said second image relative to said first image;
    refining said displacement by searching a plurality of pixel locations comprised in said first area for a correspondence to said first portion;
    determining if said displacement is an intentional displacement by checking whether said sequence of displacements follows a uniform pattern; and
    displaying a second area which covers only a second portion of said second image, wherein said second area is shifted by opposite of said displacement in relation to said first area and said correspondence.

5. The method of claim 4, further comprising maintaining a window which specifies the portion of images displayed by said displaying, wherein said window is moved by opposite of said displacement prior to displaying of said second area.

6. The method of claim 5, wherein said window, said first image, said second image, said first area and said second area are all rectangles.

7. The method of claim 6, further comprising:
    receiving a sequence of sets of pixel values following said second set of pixel values, said sequence of sets of pixel values representing a corresponding sequence of images, said sequence of sets of pixel values including a third set of pixel values and a fourth set of pixel values, wherein each displacement of said sequences of displacements is of an image relative to a preceding image in said sequence of images; and
    shifting said window by said sequence of displacements in displaying corresponding portions of the images only if said sequence of displacements does not follow said uniform pattern.

8. A machine readable non-transitory medium carrying one or more sequences of instructions for obtaining stable video images of a scene using a video camera, wherein execution of said one or more sequences of instructions by one or more processors contained in said video camera causes said video camera to perform the actions of:
    receiving a first source frame and a second source frame, wherein said first source frame and said second source frame respectively represent a first image and a second image of a scene captured at different time instances;
    generating a first subsampled frame from a first set of pixels in said first source frame and a second subsampled frame from a second set of pixels in said second source frame;
    computing a displacement of said second image relative to said first image;
    refining said displacement by searching a plurality of pixel locations within said first and second sets of pixels in said first and second source frames for a correspondence to said first and second subsampled frames;

determining if said displacement is an intentional displacement by checking whether said sequence of displacements follows a uniform pattern; and shifting said second source frame by an opposite of said displacement when said sequence of displacements does not follow a uniform pattern.

9. The machine readable non-transitory medium of claim 8, wherein said video camera estimates a first displacement based on image content represented by said first subsampled image and said second subsampled image, and determines said a second with a higher resolution than said first displacement by scaling said first displacement by comparing said first source image and said first subsampled frame.

10. The machine readable non-transitory medium of claim 9, wherein said higher resolution comprises a resolution equivalent to a resolution of the first and second source frames.

11. A machine readable non-transitory medium carrying one or more sequences of instructions for obtaining stable video images of a scene using a video camera, wherein execution of said one or more sequences of instructions by one or more processors contained in said video camera causes said video camera to perform the actions of:

receiving a first set of pixel values representing a first image;

displaying a first area which covers only a first portion of said first image;

receiving a second set of pixel values representing a second image;

determining a displacement of said second image relative to said first image, said displacement being comprised in a sequence of displacements corresponding to a plurality of images including said first and second images;

refining said displacement by searching a plurality of pixel locations within said first and set of pixel values in said first image for a correspondence to said first area;

determining if said displacement is an intentional displacement by checking whether said sequence of displacements follows a uniform pattern; and displaying a second area which covers only a second portion of said second image, wherein said second area is shifted by opposite of said displacement in relation to said first area and said correspondence.

12. The machine readable non-transitory medium of claim 11, wherein said video camera maintains a window which specifies the portion of images displayed by said displaying, wherein said window is moved by opposite of said displacement prior to displaying of said second area.

13. The machine readable non-transitory medium of claim 12, wherein said window, said first image, said second image, said first area and said second area are all rectangles.

14. The machine readable non-transitory medium of claim 13, wherein said video camera receives a sequence of sets of pixel values following said second set of pixel values, said sequence of sets of pixel values representing a corresponding sequence of images, said sequence of sets of pixel values including a third set of pixel values and a fourth set of pixel values, wherein each displacement of said sequences of displacements is of an image relative to a preceding image in said sequence of images; and wherein said window is shifted by said sequence of displacements in displaying corresponding portions of the images only if said sequence of displacements does not follow said uniform pattern.

15. A video camera designed to provide stable video images of a scene, said video camera comprising:

an image sensor designed to receive light representing an image of said scene, and generating a plurality of frames including a first source frame and a second source frame, wherein said first source frame and said second source frame respectively represent a first image and a second image of a scene captured at different time instances; and an image processor operable to:

receive said first source frame and said second source frame;

generate a first subsampled frame from a first set of pixels in said first source frame and a second subsampled frame from a second set of pixels in said second source frame;

compute a displacement of said second image relative to said first image by examining said first subsampled frame and said second subsampled frame;

refine said displacement by searching a plurality of pixel locations within said first and second sets of pixels in said first and second source frames for a correspondence to said first and second subsampled frames;

determine if said displacement is an intentional displacement by determining whether said displacement is comprised in a sequence of displacements following a uniform pattern; and shift said second source frame by an opposite of said displacement when said sequence of displacements is determined to follow a uniform pattern.

16. The video camera of claim 15, wherein said image processor is further operable to:

estimate a first displacement based on image content represented by said first subsampled frame and said second subsampled frame; and determine a second displacement with a higher resolution than said first displacement by scaling said first displacement by comparing said first source frame and said second source frame.

17. A video camera designed to provide stable video images of a scene, said video camera comprising:

an image sensor designed to receive light representing an image of said scene, and generating a plurality of frames including a first source frame and a second source frame, wherein said first source frame and said second source frame respectively represent a first image and a second image of a scene captured at different time instances; and an image processor operable to:

receive a first set of pixel values representing a first image;

display a first area which covers only a first portion of said first image;

receive a second set of pixel values representing a second image;

determine a displacement of said second set of pixel values relative to said first set of pixel values, said displacement being comprised in a sequence of displacements corresponding to a plurality of images including said first and second images;

refine said displacement by searching a plurality of pixel locations comprised in said first image for a correspondence in said first portion;

determine if said displacement is an intentional displacement by checking whether said sequence of displacements follows a uniform pattern; and display a second area which covers only a second portion of said second image, wherein said second area is shifted by opposite of said displacement in relation to said first area.

18. The video camera of claim 17, wherein said image processor is operable to maintain a window which specifies the portion of images displayed by said displaying, wherein said window is moved by opposite of said displacement prior to displaying of said second area.

19. The video camera of claim 18, wherein said window, said first image, said second image, said first area and said second area are all rectangles.

20. The video camera of claim 19, wherein said image processor is further operable to:
   receive a sequence of sets of pixel values following said second set of pixel values, said sequence of sets of pixel values representing a corresponding sequence of images, said sequence of sets of pixel values including a third set of pixel values and a fourth set of pixel values, wherein each displacement of said sequences of displacements is of an image relative to a preceding image in said sequence of images; and
   shift said window by said sequence of displacements in displaying corresponding portions of the images only if said sequence of displacements does not follow said uniform pattern.

21. The video camera of claim 16, wherein said image process is further operable to search within an area formed by a number of pixels in said first and second source frames used to generate one pixel in the corresponding first and second subsampled frames.

* * * * *